United States Patent Office 3,095,334
Patented June 25, 1963

3,095,334
THIXOTROPIC MONOPROPELLANTS
Arch C. Scurlock, Alexandria, Va., assignor to Atlantic Research Corporation, Alexandria, Va., a corporation of Virginia
No Drawing. Filed Nov. 6, 1957, Ser. No. 694,897
22 Claims. (Cl. 149—21)

This invention relates to new heterogeneous monopropellant compositions capable of generating gases containing high available energy for such purposes as producing thrust or power, heat energy or gas pressure. More specifically, it relates to heterogeneous monopropellant compositions which combine the advantages of liquid and solid propellants and eliminate many of their disadvantages.

The term monopropellant refers to a composition which is substantially self-sufficient with regard to its oxidant requirements as distinguished from bipropellants where the fuel is maintained separately from the oxidizer source until admixture at the point of combustion. By heterogeneous is meant a two-phase system wherein a finely-divided, solid oxidizer is dispersed in a liquid fuel in which the oxidizer is insoluble.

Mobile liquid monopropellants, namely propellants which are injectable into a combustion chamber in the form of finely-divided droplets or sprays, possess a number of important advantages. The mass burning rate of the propellant and, thereby, the volume of combustion gases produced, are controllable by varying the rate of injection. Combustion can be stopped by shutting off flow and resumed at will. Performance is not dependent upon the temperature environment of the system. Duration of operation is limited only by capacity of the storage tanks or reservoirs. Combustion chambers need be large enough only to provide sufficient space for completion of the combustion reaction. Liquid monopropellants, furthermore, possess an important advantage over liquid bipropellants since the former require only one storage tank, one propellant pump and one set of feed lines and valves, and eliminate elaborate systems for ensuring properly proportioned flow of the separate fuel and oxidizer components and their adequate admixture in the combustion chamber.

However, the usual mobile liquid monopropellants are characterized by disadvantages such as low density, low specific impulse, high toxicity, excessive sensitivity to heat and shock resulting in detonation, and corrosiveness to various parts of the system, such as valves. When used in a rocket motor, there is some tendency for unburned droplets of the liquid propellant to leave the combustion chamber and to be cooled during expansion in the nozzle before combustion occurs. Performance may also be affected by attitude of the system.

Not only is a complex system of tubing and valves required to fill the mobile liquid monopropellant tanks and from there into the combustion chamber, but provision must be made to purge it of propellant after test firings are made. Metal catalysis problems are sometimes encountered in passing the liquid through the complex tube and valve system. Catalyst beds are required for combustion of some liquid propellants and vibration of the system often poses problems of retaining the bed firmly fixed in the combustion chamber. Storage and transportation of liquid propellants is also a problem because of its tendency to leak readily. Such leakage presents both a fire and toxicity hazard.

Solid propellants possess the advantages of high density, low heat and shock sensitivity, good stability, long storageability, absence of leakage, low corrosiveness and toxicity and elimination of propellant filling and injection equipment and controls since all of the solid propellant is contained directly in the combustion chamber. Solid propellants do not require purging of the system after test firing, do not need an external combustion catalyst and are not affected by the attitude of the system.

Such propellants do, however, possess a number of disadvantages. The solid grain must be sufficiently strong and free from mechanical flaws so that it does not crack or shatter under pressure or vibrational stresses. Many solid propellants also tend to become excessively brittle at low ambient temperatures and thereby subject to fracture. Cracking or shattering of the propellant grain in the combustion chamber may cause such an enormous, uncontrolled increase in burning surface that the walls of the combustion chamber cannot withstand the pressure. Although a burning solid propellant grain can be quenched, if necessary, by suitable means, reignition is not feasible, so that the unburned portion is a total loss and intermittent operation is impractical. Ambient temperature of the propellant grain is an important parameter in determining burning rate and cannot be compensated for during use by variation of the area of burning surface.

Solid propellant grains must be predesigned with respect to burning surface area for each particular application, since such area is set for a given grain and cannot subsequently be varied. This makes necessary the production and storage of a large variety of grains of different design. Such predesigned solid propellant grains cannot accommodate during burning to variations in operational requirements or to different ambient temperatures. The only way in which a solid propellant gas-generating composition can be designed to meet unforeseen operational needs is to design it to produce an adequate supply of gases at the extremes of high usage requirements and low ambient temperature, which in most cases necessitates venting and wasting surplus gas at other operating conditions. Wastage in this manner can be as high as 80% of the gas produced and provides a design problem in terms of a modulating valve which can withstand the high temperature exhaust gases. Size of the grains must also be predetermined and permits no subsequent variation in amount consumed unless waste of an unburned portion of the grain poses no economic or other problem. Maximum duration of burning time or thust is considerably shorter than that of liquid propellants which is limited largely only by storage capacity of the reservoir.

The combustion chamber must be of sufficient size to accommodate all of the propellant and, therefore, is generally larger than required for combustion of a liquid propellant. Since the walls of the entire combustion chamber must be strong enough to withstand the high combustion gas pressures and completely insulated or otherwise cooled to withstand the high combustion gas temperatures, this may pose a more serious weight problem than that of a propellant storage tank. The geometry of the combustion chamber is furthermore immobilized by the design requirements of the propellant grain and cannot, in many cases, be adapted to the particular structural needs of the device as a whole.

The object of this invention is to provide stable heterogeneous monopropellant compositions which are characterized by high density, high autoignition temperature, and substantial freedom from shock-sensitivity, corrosiveness and toxicity and which, furthermore, by virtue of their physical characteristics, make possible controlled feeding of the propellant into a combustion chamber, a controllable burning surface not dependent upon subdivision or atomization in the combustion chamber, quenching and reignition, non-leakage and tolerance of system attitude.

Another object is to provide stable, heterogeneous monopropellant compositions having the foregoing characteristics and advantages, which can be safely prepared, handled, transported and stored and which can be employed to generate gases having high available energy for developing thrust or power as, for example, for use in jet or rocket reaction motors, gas turbines, reciprocating engines, and the like or for providing heat or gas pressure.

Other objects and advantages of my invention will become obvious from the following detailed description.

Broadly speaking, the monopropellant compositions of my invention comprise a stable dispersion of finely-divided, insoluble solid oxidizer in a continuous matrix of a non-volatile, substantially shock-insensitive liquid fuel, the composition having sufficiently high cohesive strength to form a plastic mass which maintains the solid oxidizer in stable, uniform dispersion and which, while capable of continuous flow at ordinary to reduced temperatures under stress, nevertheless retains a formed shape for an appreciable length of time.. The compositions, which preferably are soft gels, possess characteristics of non-Newtonian liquids, namely yield to flow only under a finite stress.

Such plastic, shape-retaining compositions can be fed at ambient temperatures under pressure from a storage chamber into a combustion chamber in the form of any desired continuous coherent shape such as a column, strip or the like, with combustion taking place on the leading face of the advancing material.

The liquid fuel can be any oxidizable liquid which meets the following specifications:

(a) It preferably comprises at least 50% by weight of a stable inert material which is insensitive to shock or impact and requires an external oxidizer for combustion. Thus at least half of the liquid fuel should not contain combined oxygen as, for example, in the form of nitroso, nitro, nitrite or nitrate radicals, which is available for oxidation of other components of the molecule, such as carbon, hydrogen, silicon, or sulfur. It may, however, and often preferably does, contain combined oxygen which is not available to any appreciable extent for further oxidation, such as oxygen which is linked to a carbon, silicon, sulfur or phosphorus atom in the molecule. Up to 50% by weight, preferably less than 30 or 40%, based on the liquid vehicle, of an active, non-volatile liquid fuel containing combined oxygen available for combustion, such as nitroglycerin, diethylene glycol dinitrate, pentaerythritol trinitrate or 1,2,4-butanetriol trinitrate, can be admixed with the inert liquid fuel component, if desired, for special applications such as rocket projectile motors. Impact- or shock-sensitivity of the active component is substantially nullified by such substantial dilution with the inert liquid. Inclusion of even a small proportion of an active liquid fuel reduces the amount of solid oxidizer needed for stoichiometric combustion levels.

(b) The liquid fuel should preferably be high boiling and substantially non-volatile. Its maximum vapor pressure should preferably be not more than about 25 mm. Hg at 100° C.

(c) The liquid fuel should be mobile, namely free-flowing, at ordinary temperatures, preferably having a maximum solidification or pour point temperature of about −2° C. or less. In some cases, for example, a maximum pour point as low as −60° C. may be desirable. The desirable specific, maximum solidification temperature is determined largely by ambient temperatures at point of use of the propellant compositions.

The use of at least 50% of an inert, shock insensitive liquid fuel, makes possible the formulation of fuel-solid oxidizer monopropellant compositions which have very low sensitivity to shock or impact. The compositions are also substantially insensitive to heat, minimum auto-ignition temperatures generally being at least about 175° C., namely well above any environmental temperatures likely to be encountered.

Substantial non-volatility ensures extended storageability even at relatively high environmental temperatures without loss by vaporization of the fuel component. This is essential not only to maintain the predesigned combustion characteristics of the monopropellant but also to retain its desired physical characteristics. Vaporization of sufficient of the liquid fuel to leave a solid, granular mass would make the monopropellant unfit for the desired mode of use.

The liquid fuel must be mobile at ordinary to reduced temperatures to make possible the desired plasticity of the monopropellant mixture at ambient temperatures of use and to prevent freezing of the monopropellant at relatively low ambient environmental temperatures of use into a non-plastic solid mass. Solidification of the composition during storage or shipping at freezing temperatures is of no concern so long as ambient temperature at time of use is above the solidification temperature since plasticity and extrudability is restored at the higher temperature.

The inert liquid fuel can be any oxidizable liquid, which forms gaseous combustion products, preferably an organic liquid, which, in addition to carbon and hydrogen, can contain other elements such as oxygen, nitrogen, sulfur, phosphorus or silicon, which meets the aforedescribed requirements in terms of physical and chemical properties. Such liquid fuels include hydrocarbons, e.g., triethyl benzene, dodecane and the like; compounds containing some oxygen linked to a carbon atom, such as esters, e.g., methyl maleate, diethyl phthalate, butyl oxalate, dibutyl sebacate, dioctyl adipate, etc.; alcohols, e.g. benzyl alcohol, diethylene glycol, triethylene glycol, etc.; ethers, e.g., methyl α-naphthyl ether; ketones, e.g., benzyl methyl ketone, phenyl o-tolyl ketone, isophorone; acids, e.g., 2-ethylhexoic acid, caproic acid, n-heptylic acid, etc.; aldehydes, e.g., cinnamaldehyde; nitrogen-containing organic compounds such as amines, e.g., N-ethylphenylamine, tri-n-butylamine, diethyl aniline; nitriles, e.g., capronitrile; phosphorus-containing compounds, e.g., triethyl phosphate; sulfur-containing compounds, e.g., diethyl sulfate, pentamethyldisiloxanemethyl methacrylate, and many others.

In many cases, I prefer to employ an inert liquid fuel containing some oxygen, which, although not available for combustion, as is the case in carbon-linked oxygen, reduces the stoichiometric oxygen requirements for the remainder of the fuel molecule. In the case of such carbon- and hydrogen-rich fuels as hydrocarbons, it is sometimes difficult to incorporate sufficient solid oxidizer to permit stoichiometric combustion levels without forming the composition into an undesirable solid, granular mass unsuitable for my purpose. However, stoichiometric proportions, although generally desirable in rocket motors, is not always essential in other gas generator applications. In fact, reduced oxidation levels are often preferred in gas generators producing power rather than thrust because of equipment design problems posed by excessively high temperatures.

The amount of liquid fuel vehicle in the composition is critical only insofar as an adequate amount must be present to provide a continuous matrix in which the solid phase is dispersed. This will vary to some extent with the particular solids dispersed, their shape and degree of subdivision and can readily be determined by routine test formulation. The minimum amount of liquid required generally is about 8%, usually about 10% by weight. Beyond the requisite minimum any desired proportion of liquid fuel to dispersed solid can be employed, depending on the desired combustion properties, since the desired cohesive, shape-retentive properties can be obtained by additives such as gelling agents. Where the requisite cohesiveness and plasticity are obtained by proper size distribution of the finely divided solid without an additional gelling agent, the amount of solid incorporated should be sufficient to provide the consistency essential for shape-rententiveness. This will vary with the particular liquid vehicle, the particular solid and its size distribution and can readily be determined by routine testing.

The solid oxidizer can be any suitable, active oxidizing agent which yields oxygen readily for combustion of the fuel and which is insoluble in the liquid fuel vehicle. Suitable oxidizers include the inorganic oxidizing salts, such as ammonium, sodium, potassium and lithium perchlorate or nitrate, metal peroxides such as barium peroxide and the like. The solid oxidizer should be finely divided, preferably with a maximum particle size of about 300 to 600 microns, to ensure stable, uniform dispersion of the oxidizer in the liquid fuel, so that it will not separate or sediment despite lengthy storage periods, although some somewhat larger particles can be maintained in gelled compositions without separation.

As aforementioned, the monopropellant compositions of my invention comprise stable dispersions of finely divided, insoluble solid oxidizer in a continuous matrix of a liquid fuel and possess sufficient cohesive strength to retain a formed shape while retaining sufficient plasticity to flow continuously at ordinary to reduced temperature under pressure. Such a two-phase system, namely a solid uniformly dispersed in a continuous liquid matrix ensures smooth, continuous coherent flow and, very importantly, a constant mass burning rate for a given area of exposed burning surface. In this respect the burning properties are similar to those of a solid propellant grain. A solid, granular material produced, for example, by absorption of a liquid fuel on solid particles without formation of a continuous matrix, is not suitable for my purpose since such a material, although possibly extrudable under high pressures, does not possess sufficient cohesive strength to prevent breaking up of the extruded material, particularly under vibrational, accelerational, or other stresses in the combustion chamber and does not present a continuous, even burning surface because of intergranular spaces.

The shape-retentive cohesiveness of the monopropellant material should preferably be sufficiently high so that it possesses a minimum tensile strength of about 0.01 p.s.i. and preferably about 0.03 p.s.i. or higher. The material should, however, be capable of yielding to continuous flow at ordinary to reduced temperatures under stress or pressure. The use of excessively high pressures to produce the requisite flow is undesirable for practical reasons, although available pressure-producing devices will, of course, vary with particular applications. The maximum shear stress at a wall required to initiate and sustain flow of the composition at ordinary or ambient temperature is preferably not higher than about 1 p.s.i. wtih a maximum of about 10 p.s.i.

Compositions having thixotropic properties, namely compositions, which, above a certain minimum stress, tend to increase in fluidity with increasing stress and to decrease in fluidity with decreasing stress, are particularly suitable for my purpose, especially since frictional or shearing stresses exerted on the surface of the extruding material by the walls of the injection tube or orifice tend to enhance fluidity at the frictional interface and to improve flow properties.

A composition having some thixotropic properties can be made by incorporating sufficient finely divided solid, insoluble oxidizer into the liquid fuel to make an extrudable mass, when the particles are so distributed that the minimum ratio of size of the largest to the smallest particles is about 2:1 and preferably about 10:1. At least 90% of the particles by weight should preferably have a maximum size of about 300 microns. Above this, a small proportion by weight up to about 600 microns can be tolerated. There is occasionally an undesirable tendency, however, for such compositions to separate after a period of several days.

Generally, I have found it desirable to impart thixotropic properties by incorporating a gelling agent in the solid oxidizer-liquid fuel dispersion. Such gels possess the desired dispersion stability, cohesiveness, shape-retentiveness and flow characteristics. Any gelling agent which forms a gel with the particular liquid fuel can be employed. Examples of gelling agents compatible with many of the non-volatile liquid fuels include natural and synthetic polymers such as polyvinyl chloride; polyvinyl acetate; cellulose esters, e.g., cellulose acetate and cellulose acetate butyrate; cellulose ethers, e.g., ethyl cellulose, and carboxymethyl cellulose; metal salts of higher fatty acids such as the Na, Mg and Al stearates, palmitates and the like; salts of naphthenic acid; casein; karaya gum; gelatin; bentonite clays and amine-treated bentonite clays; etc. Although this is not essential, I prefer to employ organic gelling agents since they can also function as fuels during combustion. The amount of gelling agent employed is largely determined by the particular liquid fuel, the particular gelling agent, and the specific physical properties desired. The amount of finely divided solid present also is a determinative factor since, broadly speaking, the smaller the amount of dispersed solid, the larger the amount of gelling agent required.

Particle size distribution of the dispersed solids is generally not an important factor in imparting cohesive, plastic properties to the composition and in minimizing separation where a gelling agent is employed since these factors are adequately provided for by the gel. Even some substantially large solid particles as, for example, up to about 1000 microns, can be held in stable dispersion. However, the presence of different size particles is often desirable because of the improved packing effect obtained, in terms of increased amounts of solids which can be incorporated.

Finely divided, solid metal powders, such as Al or Mg, can be incorporated in the monopropellant compositions as an additional fuel component along with the liquid fuel. Such metal powders possess the advantages both of increasing density and improving specific impulse of the monopropellant because of their high heats of combustion. The metal particles should preferably be within a size range of 0.25 to 50 microns. The amount of such metal fuel added is not critical but is determined largely by the specific use and the requisite physical characteristics of the composition as aforedescribed. For example, it should not be incorporated in such large amounts that the mixture either becomes granular in texture or deficient in amount of oxidizer. In general the maximum amount of metal powder which can be introduced while maintaining the desired physical properties of the composition and an adequate amount of solid oxidizer is about 45% by weight, and depends upon the density of the metal and its chemical valence or oxidant requirement for combustion.

Stoichiometric oxidizer levels with respect to the liquid fuel or liquid plus powdered metal fuels are sometimes desirable for applications where maximum heat release is wanted. Actual stoichiometric amounts of oxidizer vary, of course, with the particular fuel components and the particular oxidizer and can readily be computed by anyone skilled in the art. In general, however, the amount required will be in substantially major proportion, as for example, about 65% and generally more of the total composition. The requisite high concentrations of solid oxidizer for stoichiometry can generally be readily incorporated particularly where the liquid fuel contains some combined oxygen as aforedescribed, while maintaining its essential physical characteristics.

In some cases, as for example, where the monopropellant is being employed in a gas generator for driving a turbine, reciprocating engine, or the like, as a source of gas pressure, or to provide heat energy, the amount of oxidizer can be less than stoichiometric so long as sufficient is introduced to maintain active combustion and a desired level of gas generation. The presence of an active liquid fuel component, namely a fuel containing oxygen available for combustion, reduces, of course, the amount of solid oxidizer required both for stoichiometric and less than stoichiometric combustion levels.

Other additives which can be incorporated into the monopropellant compositions include, for example, burning rate catalysts, such as ammonium dichromate, copper chromite and ferric ferrocyanide; coolants for reducing the temperatures of the generated gases where necessary, as in the case of some turbine applications, such as monobasic ammonium phosphate, barbituric acid and ammonium oxalate; and the like.

The heterogeneous monopropellants are easily prepared, generally by mixing at ordinary temperatures. In some cases, it may be desirable to accelerate gelation by heating to dissolve the gelling agent in the liquid fuel vehicle. The solid oxidizer can then be admixed with the gelled liquid, although the order of addition is not critical. Thickening of the mixture with the appropriate small amount of gelling agent during formulation, in this manner, produces a composition having the requisite physical characteristics aforedescribed, such as viscosity and cohesiveness, without further significant change during storage, which would destroy these properties and the usefulness of the compositions for the intended mode of application. Manufacturing operations are relatively non-hazardous because of the low sensitivity of the components. Even where a portion of the liquid fuel is a highly active compound, dilution with the inert liquid reduces shock- and impact-sensitivity to an almost negligible degree and raises the autoignition point well above even unusual environmental temperatures.

*Example I*

74.2% ammonium perchlorate (a mixture of 1725 r.p.m. and 14,000 r.p.m. grinds in a ratio of 1:2; size range of 4 to 400 microns, 98% by weight under 300 microns), 24.8% triacetin and 1% copper chromite were admixed at room temperature. The resulting composition was a cohesive, shape-retentive mass which could be made to flow continuously under moderate pressure. The composition had an autoignition temperature of 275° C. and an impact sensitivity of 80/85 cm. with a 3.2 kg. weight. Burning rate of the material at atmospheric pressure was 0.04 in./sec. The material was extruded through a stainless steel tube 0.162 inch in diameter into a nitrogen-filled chamber and the leading face was burned at a rate of 0.1 in./sec. at 35 p.s.i.a.

*Example II*

76% ammonium perchlorate (2:1 mixture of 14,000 and 1725 r.p.m. grinds), 23% triacetin and 1% copper chromite were mixed at room temperature. The mixture was a cohesive, shape-retentive mass which flowed under moderate pressure. It had an autoignition temperature of 280–290° C. and an impact sensitivity of 80 cm. with a 3.2 kg. weight. Viscosity of the composition was tested in a Brookfield viscosimeter with a #7 spindle with the following results:

| R.p.m.: | Viscosity (centipoises) |
|---|---|
| 2 | 25,000 |
| 4 | 10,000 |
| 10 | 7,000 |
| 20 | 6,000 |

The reduction in viscosity with increasing spindle speed, namely increasing stress demonstrates the thixotropic properties of the material.

The composition had a linear burning rate of 0.75 in./sec. at 1000 p.s.i.a.

*Example III*

A gel was made with 75% ammonium perchlorate (1725 and 14,000 r.p.m. grinds, 1:2), 24% dibutyl sebacate and 1% polyvinyl chloride. The polyvinyl chloride was mixed with the dibutyl sebacate and heated to 170° C. to form a gel, which upon cooling, was a thickened, mobile liquid. After cooling, the gelled liquid was loaded with the ammonium perchlorate. The composition was a plastic, shape retentive mass having a tensile strength of 0.31 p.s.i. Length of an extruded column before breaking under its own weight was 5 inches. Shear stress at the wall required to initiate flow in a ⅜ inch diameter tube was 0.035 p.s.i.

The dispersion was highly stable as shown by vibrator at 60 cycles and an acceleration of 4 $g$. No separation occurred after 185 hours. The material was also tested by centrifuge at an acceleration of 800 $g$ and showed no separation after 30 minutes.

Autoignition temperature of the composition was 286° C. and its solidification or freezing point $-18°$ C.

The composition extruded as a shaped mass through a 12 inch tube with 0.375 inch bore at a rate of 0.25 in./sec. under a pressure of 11 p.s.i.

Linear burning rate of the material at 70° F. and 1000 p.s.i. was 0.46 in./sec.

*Example IV*

The following gel mixtures were prepared:

|  | A | B |
|---|---|---|
| $NH_4ClO_4$ (1725 and 14,000 r.p.m. grinds—1:2), percent | 75 | 78 |
| Dibutyl sebacate, percent | 23.5 | 21 |
| Polyvinyl chloride, percent | 1.5 | 1 |

Both compositions were plastic, cohesive, shape-retentive gels. Gel A had an autoignition temperature of 276° C., gel B 286° C.

Both compositions were tested by centrifuge at 3800 r.p.m. and an acceleration of 1590 $g$. Gel A showed no separation after 43 minutes, only 2% separation after 103 minutes, and 8% separation after 486 minutes.

*Example V*

Other compositions having the desired cohesive shape-retentive properties were as follows:

A

| | Percent |
|---|---|
| $NH_4NO_3$ (14,000 r.p.m. grind) | 49.0 |
| $NH_4ClO_4$ (1725 r.p.m. grind) | 21.0 |
| Butyl oxalate | 28.8 |
| Polyvinyl chloride | 1.2 |

B

| | |
|---|---|
| $NH_4ClO_4$ (1725 r.p.m. grind) | 49.0 |
| $NH_4NO_3$ (14,000 r.p.m. grind) | 21.0 |
| Butyl oxalate | 28.8 |
| Polyvinyl chloride | 1.2 |

C

| | |
|---|---|
| $NH_4ClO_4$ (14,000 and 1725 r.p.m. grinds, 2:1) | 75.0 |
| Glyceryl (triacetylricinoleate) | 24.0 |
| Polyvinyl chloride | 1.0 |

D

| | |
|---|---|
| $NH_4ClO_4$ (14,000 and 1725 r.p.m. grinds, 2:1) | 74.0 |
| Dibutyl sebacate | 24.0 |
| Polyvinyl chloride | 1.0 |
| Copper chromite | 1.0 |

Autoigniiton temperature, 275° C.
Impact sensitivity, partial detonation at 130 cm. with 3.2 kg. weight
Solidification temperature, $-18°$ C.
Extruded through ⅜ inch diameter tube at rate of 1 gram/sec. under applied gage pressure of 10 in. Hg It will be noted, as exemplified by the aforedescribed compositions, that the semi-solid monopropellants are formulated in such manner that they do not change significantly during storage for indefinitely long periods of time, and thereby retain their semi-fluidity permanently. They are, of course, subject to normal fluctuations in viscosity with fluctuations in ambient temperature.

The heterogeneous monopropellants of my invention, in terms of specific impulse and high density, closely approach the high performance levels of solid propellants. The high density produced by inclusion of the solid oxidizer and, in some cases, additionally of a finely divided solid metal fuel, makes possible a high weight/volume loading ratio as compared with conventional mobile liquid propellant, and thereby reduced storage tank capacity requirements or increased fuel capacity, in terms of performance, for a storage chamber of given size.

The high autoignition temperature, low shock- and impact-sensitivity, non-corrosiveness and non-toxicity, conferred by the inert, low pour-point, high-boiling, liquid fuel, make the monopropellant compositions safe to handle, to transport and to store for extended periods of time under substantially any environmental temperature conditions likely to be encountered. The stable gel or gel-like compositions do not leak. This is another important advantage as compared with mobile liquids in terms of reduced fire and toxicity hazard and simplification of personnel and equipment precaution.

The unique physical characteristics of the monopropellant compositions make possible a new and highly advantageous method for generating gases of high available energy by extruding the material in the form of any desired coherent shape into a combustion chamber and burning the leading face of the continuously advancing shaped material. Because of the fluidity of the material under stress at ambient temperatures, the monopropellant can be fed into the combustion chamber at a rate adjusted to the desired mass burning rate of the composition so that at equilibrium or steady-state burning, namely when the mass burning rate does not vary with time, the burning surface of the continuously extruding propellant remains substantially stationary relative to the walls of the combustion chamber. Since burning is confined to a well-defined burning-surface area, much as in the case of the burning of solid propellant grains, combustion chamber length requirements are generally quite small, both as compared with that needed for complete reaction of sprayed or atomized conventional mobile liquid propellants and for housing and combustion of conventional solid propellant grains. This makes possible a substantial saving in dead weight, since the combustion chamber not only must be built to withstand the high combustion gas pressures, but must also be heavily insulated and made of materials, generally heavy, such as alloy steel or nickel alloys such as Inconel, which are resistant to the corrosive gases. Unlike solid propellant combustion chambers which must conform to design requirements of the propellant grain, the combustion chamber for use with my propellant compositions can be designed to meet the shape or other requirements of the particular gas generator device.

Burning surface area of the extruded shape-retaining monopropellant can be predesigned and controlled by such means as varying the number, shape and size of the injection orifices and by varying the rate of extrusion of the propellant into the combustion chamber. Thus, mass burning rate of the propellant and amount and pressure of combustion gases generated can easily be regulated by controlled feeding. In this way, the rate of gas generation can be tailored to particular requirements both before and during operation within limits set by the particular properties of the monopropellant compositions and the structural limitations of the rocket, gas generator or other device. Similarly, factors affecting burning rate of the propellant material, such as its ambient temperature or pressure conditions in the combustion chamber can be compensated for by controlling feeding rate or adjustment of the size or shape of the mass of injected material.

Duration of combustion is limited only by the capacity of the mono-propellant storage container and appropriate means for cooling the walls of the combustion chamber and can be continuous or intermittent. Combustion can be quenched at any time by any suitable means such as a cut-off device which closes the injection orifice. Combustion can be reinitiated by opening the shut-off mechanism and reigniting the leading face of the extruding propellant.

The stable, uniform dispersion of the finely-divided solid oxidizer or oxidizer and solid metal fuel, ensures uniformity of burning rate at the constantly generating burning surface as the end-burning material advances. This is of considerable importance since it assures a constant or controllable rate of gas generation.

The cohesiveness of the shape-retaining gel composition, furthermore, generally is sufficiently high to maintain integrity of the propellant under conditions of vibration and acceleration against breaking-off or separation of portions of the extruding mass into the combustion chamber. This is of importance not only for control of the desired burning surface area but to avoid loss or wastage of unburned propellant in some applications, as, for example, rocket motors, by venting of the material out the nozzle under such conditions as high acceleration. This is frequently a problem in the case of the burning of atomized mobile liquid propellants, some unburned particles of which fly out the Venturi nozzle.

Another advantage of the monopropellants stems from their substantial non-fluidity except under stress since, unlike mobile liquids, it makes the system substantially immune to attitude. This makes unnecessary elaborate precautions to maintain the stored propellant in constant communication with the feeding orifice into the combustion chamber.

Like conventional ambient liquid monopropellants, as distinguished from liquid bipropellants, the system requires only one storage container or reservoir, one set of pressurizing means, feeding tubes and control valves, thereby simplifying the complexity of the device and reducing weight. There is also no need for combustion catalysts in the combustion chamber. Construction problems are further simplified by non-corrosiveness of the fuel.

Thus, it will be seen that the heterogeneous monopropellants of my invention combine the advantages of the conventional mobile liquid monopropellants and solid propellants and eliminate most of their disadvantages. Like the solid propellants, the compositions are characterized by excellent stability, high denstiy, low sensitivity to shock and impact, high autoignition temperatures, high specific impulse, absence of leakage, excellent storageability and system-attitude tolerance. They are free from such defects of solid propellants as the requirements of predetermined, set parameters such as predesigned shaping and size, venting and wasting of large amounts of surplus gases, limitation as to duration of the combustion cycle, inability to compensate for ambient temperature effect on burning rate, tendency to become brittle at low ambient temperatures which frequently causes fracturing, the dangers of mechanical flaws, impracticality of reignition and intermittent action, and large combustion chamber size.

I claim:

1. In a heterogeneous monopropellant composition consisting essentially of a dispersion of finely-divided, insoluble, solid inorganic oxidizer in a continuous oxidizable organic fuel matrix, which forms gaseous combustion products, and said organic fuel matrix being selected from the group consisting of an inert organic compound which does not contain combined oxygen available for combustion of other components of the molecule and requires an external oxidizer for combustion and an active organic compound which contains combined oxygen available for oxidation of other molecularly-combined components of said active compound, said inert compound being selected from the group consisting of compounds containing molecularly-combined carbon, hydrogen, and oxygen and compounds containing molecularly-combined carbon, hydrogen, and nitrogen, said active compound containing a radical selected from the group consisting of nitroso, nitro, nitrite and nitrate, said oxidizer being present in amount sufficient to maintain active combustion of the inert organic fuel compound, said organic fuel matrix containing, in addition, from 0 to a minor amount of a gelling agent, all of which is dissolved therein, the improvement in which said organic fuel matrix, including said dissolved gelling agent when present, is a liquid which is mobile at ordinary temperatures, which comprises at least about 8% by weight of said composition, which comprises one or more liquid components, all of which have a maximum vapor pressure of about 25 mm. Hg at 100° C., said liquid components consisting essentially of at least 50% by weight of said inert organic compound, said inert compound being a liquid at ordinary temperatures, and from 0 to about 50% by weight of said active organic compound, said active compound being a liquid at ordinary temperatures, said monopropellant being an extrudable, thixotropic composition which requires a finite stress to produce flow, is indefinitely capable, after storage, of continuous flow at ambient temperatures under a maximum shear stress at a wall of 10 p.s.i. and has a minimum tensile strength of about 0.01 p.s.i.

2. The monopropellent composition of claim 1 in which the solid oxidizer comprises particles of different size.

3. The monopropellent composition of claim 2 in which the minimum tensile strength of the composition is about 0.03 p.s.i. and the solid oxidizer comprises particles distributed in size such that the minimum ratio of the largest and the smallest particles is about 2:1.

4. The monopropellent composition of claim 1 in which the oxidizer is a solid, inorganic, oxidizing salt.

5. The monopropellent composition of claim 1 in which said gelling agent, when present, is selected from the group consisting of natural organic polymers, synthetic organic polymers, salts of higher fatty acids, salts of naphthenic acid, and bentonite clays.

6. The monopropellent composition of claim 1 in which the maximum shear stress at a wall is 1 p.s.i.

7. The monopropellent composition of claim 5 in which the maximum shear stress at a wall is 1 p.s.i.

8. The monopropellent composition of claim 5 in which the said oxidizer comprises particles of different size.

9. The monopropellent composition of claim 8 in which the solid oxidizer comprises particles of different size and the minimum tensile strength of the composition is about 0.03 p.s.i.

10. The monopropellent composition of claim 1 in which the inert organic liquid fuel component is an organic ester.

11. The monopropellent composition of claim 5 in which the inert organic liquid fuel component is an organic ester.

12. The monopropellent composition of claim 5 in which the oxidizer is a solid, inorganic, oxidizing salt.

13. The monopropellent composition of claim 4 in which the oxidizer is ammonium perchlorate.

14. The monopropellent composition of claim 12 in which the oxidizer is ammonium perchlorate.

15. The monopropellent composition of claim 1 which contains in addition a finely divided metal fuel dispersed in said continuous matrix of said liquid fuel.

16. The monopropellent composition of claim 15 in which the maximum shear stress at a wall is 1 p.s.i.

17. The monopropellent composition of claim 5 which contains in addition a finely divided metal fuel dispersed in said continuous matrix of said liquid fuel.

18. The monopropellent composition of claim 15 in which the oxidizer comprises particles of different sizes.

19. The monopropellent composition of claim 15 in which the inert liquid fuel component is an organic ester.

20. The monopropellent composition of claim 15 in which the oxidizer is a solid, inorganic oxidizing salt.

21. The monopropellent composition of claim 15 in which the metal fuel is aluminum.

22. The monopropellent composition of claim 11 in which the gelling agent is polyvinyl chloride.

References Cited in the file of this patent

UNITED STATES PATENTS

| | | |
|---|---|---|
| 2,067,213 | Snelling | Jan. 12, 1937 |
| 2,445,312 | Cooke et al. | July 20, 1948 |
| 2,477,549 | Van Loenen | July 26, 1949 |
| 2,530,493 | Van Loenen | Nov. 21, 1950 |
| 2,537,039 | Downard | Jan. 9, 1951 |
| 2,541,389 | Taylor | Feb. 13, 1951 |
| 2,570,990 | Southern et al. | Oct. 9, 1951 |
| 2,574,466 | Clay et al. | Nov. 13, 1951 |
| 2,712,989 | Maisner | July 12, 1955 |
| 2,751,360 | Van Strien | June 19, 1956 |
| 2,966,403 | Weil | Dec. 27, 1960 |
| 2,966,404 | Taylor et al. | Dec. 27, 1960 |

FOREIGN PATENTS

| | | |
|---|---|---|
| 582,621 | Great Britain | July 13, 1943 |

OTHER REFERENCES

"Jet Propulsion," Air Technical Service Command, Jet Propulsion Lab. (Galcit), Cal. Inst. Tech. (1946), page 152.